US011558665B2

(12) United States Patent
Soundararajan et al.

(10) Patent No.: US 11,558,665 B2
(45) Date of Patent: *Jan. 17, 2023

(54) METHODS AND APPARATUS TO COUNT PEOPLE

(71) Applicant: The Nielsen Company (US), LLC, New York, NY (US)

(72) Inventors: Padmanabhan Soundararajan, Tampa, FL (US); Marko Usaj, Izola (SI); Venugopal Srinivasan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,775

(22) Filed: Apr. 8, 2022

(65) Prior Publication Data

US 2022/0232283 A1    Jul. 21, 2022

Related U.S. Application Data

(63) Continuation of application No. 17/087,335, filed on Nov. 2, 2020, now Pat. No. 11,303,960, which is a
(Continued)

(51) Int. Cl.
  *H04N 21/442* (2011.01)
  *H04N 3/09* (2006.01)
  (Continued)

(52) U.S. Cl.
  CPC ... *H04N 21/44218* (2013.01); *G06F 16/5838* (2019.01); *G06V 20/53* (2022.01);
  (Continued)

(58) Field of Classification Search
  CPC ....... H04N 21/44218; H04N 21/25891; H04N 3/09; H04N 21/6582; H04N 21/44008;
  (Continued)

(56) References Cited

U.S. PATENT DOCUMENTS

| 5,331,544 A | 7/1994 | Lu et al. |
| 5,432,864 A | 7/1995 | Lu et al. |

(Continued)

OTHER PUBLICATIONS

United States Patent and Trademark Office, "Notice of Allowance," mailed in connection with U.S. Appl. No. 14/635,360, dated Jan. 26, 2018, 11 pages.

United States Patent and Trademark Office, "Non-Final Office Action," mailed in connection with U.S. Appl. No. 14/635,360, dated Jun. 30, 2017, 37 pages.

(Continued)

*Primary Examiner* — Nicholas T Corbo
(74) *Attorney, Agent, or Firm* — Hanley, Flight & Zimmerman, LLC

(57) ABSTRACT

Methods and apparatus to count people are disclosed. Example apparatus disclosed herein are to populate a list with first characteristic datasets obtained from a first plurality of images, respective ones of the first characteristic datasets representative of corresponding faces. Disclosed apparatus are also to perform comparisons of the first characteristic datasets to each other to determine a first number of unique faces, the comparisons limited to the first characteristic datasets obtained during the first period of time. Disclosed apparatus are further to delete the first characteristic datasets from the list after the first period of time has ended, and re-populate the list with second characteristic datasets obtained from a second plurality of images representative of the environment during a second period of time of the media presentation, the second period of time subsequent to the first period of time.

20 Claims, 9 Drawing Sheets

Related U.S. Application Data continuation of application No. 16/706,396, filed on Dec. 6, 2019, now Pat. No. 10,827,218, which is a continuation of application No. 15/990,367, filed on May 25, 2018, now Pat. No. 10,506,285, which is a continuation of application No. 14/635,360, filed on Mar. 2, 2015, now Pat. No. 9,986,289.

(51) Int. Cl.

| | | |
|---|---|---|
| *H04N 21/433* | (2011.01) | |
| *G06F 16/583* | (2019.01) | |
| *H04H 60/45* | (2008.01) | |
| *H04N 21/258* | (2011.01) | |
| *H04N 21/4223* | (2011.01) | |
| *H04N 21/44* | (2011.01) | |
| *H04N 21/658* | (2011.01) | |
| *G06V 20/52* | (2022.01) | |
| *G06V 40/16* | (2022.01) | |
| *H04N 9/24* | (2006.01) | |
| *H04N 5/93* | (2006.01) | |
| *H04N 7/12* | (2006.01) | |
| *H04N 5/76* | (2006.01) | |
| *H04N 7/18* | (2006.01) | |
| *H04H 60/33* | (2008.01) | |
| *H04N 5/91* | (2006.01) | |
| *H04N 5/33* | (2006.01) | |
| *G02B 26/10* | (2006.01) | |
| *G01B 3/20* | (2006.01) | |
| *G04F 3/06* | (2006.01) | |
| *G06K 7/06* | (2006.01) | |
| *H04N 17/00* | (2006.01) | |
| *G01B 3/00* | (2006.01) | |
| *G01C 11/02* | (2006.01) | |
| *H04N 9/87* | (2006.01) | |
| *G01B 5/30* | (2006.01) | |
| *G02B 27/00* | (2006.01) | |
| *G06T 7/11* | (2017.01) | |
| *G09B 5/02* | (2006.01) | |
| *G06V 20/59* | (2022.01) | |

(52) U.S. Cl.
CPC ............ *G06V 40/161* (2022.01); *H04H 60/45* (2013.01); *H04N 3/09* (2013.01); *H04N 21/25891* (2013.01); *H04N 21/4223* (2013.01); *H04N 21/4334* (2013.01); *H04N 21/44008* (2013.01); *H04N 21/44222* (2013.01); *H04N 21/44224* (2020.08); *H04N 21/6582* (2013.01); *G01B 3/006* (2013.01); *G01B 3/20* (2013.01); *G01B 5/30* (2013.01); *G01C 11/025* (2013.01); *G02B 26/10* (2013.01); *G02B 27/0093* (2013.01); *G04F 3/06* (2013.01); *G06K 7/06* (2013.01); *G06T 7/11* (2017.01); *G06T 2207/30201* (2013.01); *G06V 20/59* (2022.01); *G06V 40/173* (2022.01); *G09B 5/02* (2013.01); *H04H 60/33* (2013.01); *H04N 5/33* (2013.01); *H04N 5/76* (2013.01); *H04N 5/91* (2013.01); *H04N 5/93* (2013.01); *H04N 7/125* (2013.01); *H04N 7/188* (2013.01); *H04N 9/24* (2013.01); *H04N 9/87* (2013.01); *H04N 17/00* (2013.01)

(58) Field of Classification Search
CPC ......... H04N 21/44222; H04N 21/4223; H04N 21/4334; H04N 5/33; H04N 5/76; H04N 7/188; H04N 5/91; H04N 7/125; H04N 9/87; H04N 5/93; H04N 9/24; H04N 17/00; G06K 9/00228; G06K 9/00778; G06K 9/00295; G06K 7/06; G06K 9/00832; G06F 16/5838; H04H 60/45; H04H 60/33; G06T 7/11; G06T 2207/30201; G01C 11/025; G01B 5/30; G01B 3/006; G01B 3/20; G04F 3/06; G02B 27/0093; G02B 26/10; G09B 5/02

See application file for complete search history.

(56) References Cited

U.S. PATENT DOCUMENTS

| | | |
|---|---|---|
| 5,550,928 A | 8/1996 | Lu et al. |
| 5,771,307 A | 6/1998 | Lu et al. |
| 5,905,807 A | 5/1999 | Kado et al. |
| 6,108,437 A | 8/2000 | Lin |
| 6,873,713 B2 | 3/2005 | Okazaki et al. |
| 6,940,545 B1 | 9/2005 | Ray et al. |
| 7,146,050 B2 | 12/2006 | Lienhart et al. |
| 7,519,200 B2 | 4/2009 | Gokturk et al. |
| 7,555,148 B1 | 6/2009 | Steinberg et al. |
| 7,612,796 B2 | 11/2009 | Lev-Ran et al. |
| 7,643,658 B2 | 1/2010 | Kilner et al. |
| 8,135,220 B2 | 3/2012 | Kim et al. |
| 8,150,109 B2 | 4/2012 | Sung et al. |
| 8,235,725 B1 | 8/2012 | Hill |
| 8,401,248 B1 | 3/2013 | Moon et al. |
| 8,712,110 B2 | 4/2014 | Eckhoff et al. |
| 9,986,289 B2 | 5/2018 | Soundararajan et al. |
| 10,506,285 B2 | 12/2019 | Soundararajan et al. |
| 10,827,218 B2 | 11/2020 | Soundararajan et al. |
| 11,303,960 B2 | 4/2022 | Soundararajan et al. |
| 2006/0093185 A1 | 5/2006 | Kato et al. |
| 2008/0181512 A1 | 7/2008 | Gavin et al. |
| 2008/0285817 A1 | 11/2008 | Imamura |
| 2010/0172551 A1 | 7/2010 | Gilley et al. |
| 2011/0310214 A1 | 12/2011 | Saleh et al. |
| 2013/0050416 A1 | 2/2013 | Iwasaki et al. |
| 2013/0051677 A1 | 2/2013 | Lee |
| 2013/0160039 A1 | 6/2013 | Mentz et al. |
| 2013/0216207 A1 | 8/2013 | Berry et al. |
| 2013/0290994 A1 | 10/2013 | Machado et al. |
| 2014/0002644 A1 | 1/2014 | Fedorovskaya et al. |
| 2014/0056527 A1 | 2/2014 | Susanu et al. |
| 2014/0105461 A1 | 4/2014 | Srinivasan et al. |
| 2014/0161305 A1 | 6/2014 | Lee et al. |
| 2014/0294258 A1 | 10/2014 | King |
| 2014/0341425 A1 | 11/2014 | Babacan et al. |
| 2014/0344017 A1 | 11/2014 | Deephanphongs et al. |
| 2015/0002650 A1 | 1/2015 | Yoshimura et al. |
| 2016/0261911 A1 | 9/2016 | Soundararajan et al. |
| 2018/0174600 A1 | 6/2018 | Chaudhuri et al. |
| 2020/0221175 A1 | 7/2020 | Soundararajan et al. |

OTHER PUBLICATIONS

United States Patent and Trademark Office, "Final Office Action," mailed in connection with U.S. Appl. No. 14/635,360, dated Oct. 18, 2016, 36 pages.

United States Patent and Trademark Office, "Non-Final Office Action," mailed in connection with U.S. Appl. No. 14/635,360, dated Feb. 26, 2016, 26 pages.

United States Patent and Trademark Office, "Notice of Allowance," mailed in connection with U.S. Appl. No. 15/990,367, dated Jul. 22, 2019, 15 pages.

United States Patent and Trademark Office, "Notice of Allowance," mailed in connection with U.S. Appl. No. 16/706,396, dated Jun. 24, 2020, 17 pages.

United States Patent and Trademark Office, "Corrected Notice of Allowability," mailed in connection with U.S. Appl. No. 16/706,396, dated Aug. 14, 2020, 6 pages.

United States Patent and Trademark Office, "Notice of Allowance," mailed in connection with U.S. Appl. No. 17/087,335, dated Dec. 8, 2021, 18 pages.

| TEMPORARY LIST 408 ||  |
|---|---|---|
| LOCATION ID 500 | CHARACTERISTIC DATASETS 502 ||
| - | - | - |
| - | - | - |
| - | - | - |
| ⋮ |||
| - | - | - |

FIG. 5

METHODS AND APPARATUS TO COUNT PEOPLE

RELATED APPLICATION(S)

This patent arises from a continuation of U.S. patent application Ser. No. 17/087,335, filed Nov. 2, 2020, which is a continuation of U.S. patent application Ser. No. 16/706, 396, filed Dec. 6, 2019, which is a continuation of U.S. patent application Ser. No. 15/990,367, filed May 25, 2018, which is a continuation of U.S. patent application Ser. No. 14/635,360, filed Mar. 2, 2015. Priority to U.S. patent application Ser. No. 17/087,335, U.S. patent application Ser. No. 16/706,396, U.S. patent application Ser. No. 15/990,367 and U.S. patent application Ser. No. 14/635,360 is claimed. U.S. patent application Ser. No. 17/087,335, U.S. patent application Ser. No. 16/706,396, U.S. patent application Ser. No. 15/990,367 and U.S. patent application Ser. No. 14/635, 360 are incorporated by reference herein in their respective entireties.

FIELD OF THE DISCLOSURE

This disclosure relates generally to audience measurement and, more particularly, to methods and apparatus to count people.

BACKGROUND

Audience measurement of media (e.g., content and/or advertisements, such as broadcast television and/or radio programs and/or advertisements, streaming media, stored audio and/or video programs and/or advertisements played back from a memory such as a digital video recorder or a digital video disc, audio and/or video programs and/or advertisements played via the Internet, video games, etc.) often involves collection of media identifying data (e.g., signature(s), fingerprint(s), code(s), channel information, time of presentation information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

In some audience measurement systems, the collected people data includes an amount of people in a media exposure environment (e.g., a television room, a family room, a living room, a cafeteria at a place of business or lounge, a television viewing section of a store, restaurant, a bar, etc.). To calculate the amount of people in the environment, some measurement systems capture image(s) of the environment and analyze the image(s) to determine how many people appear in the image(s) at a particular date and time. The calculated amount of people in the environment can be correlated with media being presented in the environment at the particular date and time to provide exposure data (e.g., ratings data) for that media.

BRIEF DESCRIPTION OF THE DRAWINGS

FIG. 5 is an example implementation of the example temporary list 408 of FIG. 4.

DETAILED DESCRIPTION

Figure 1:
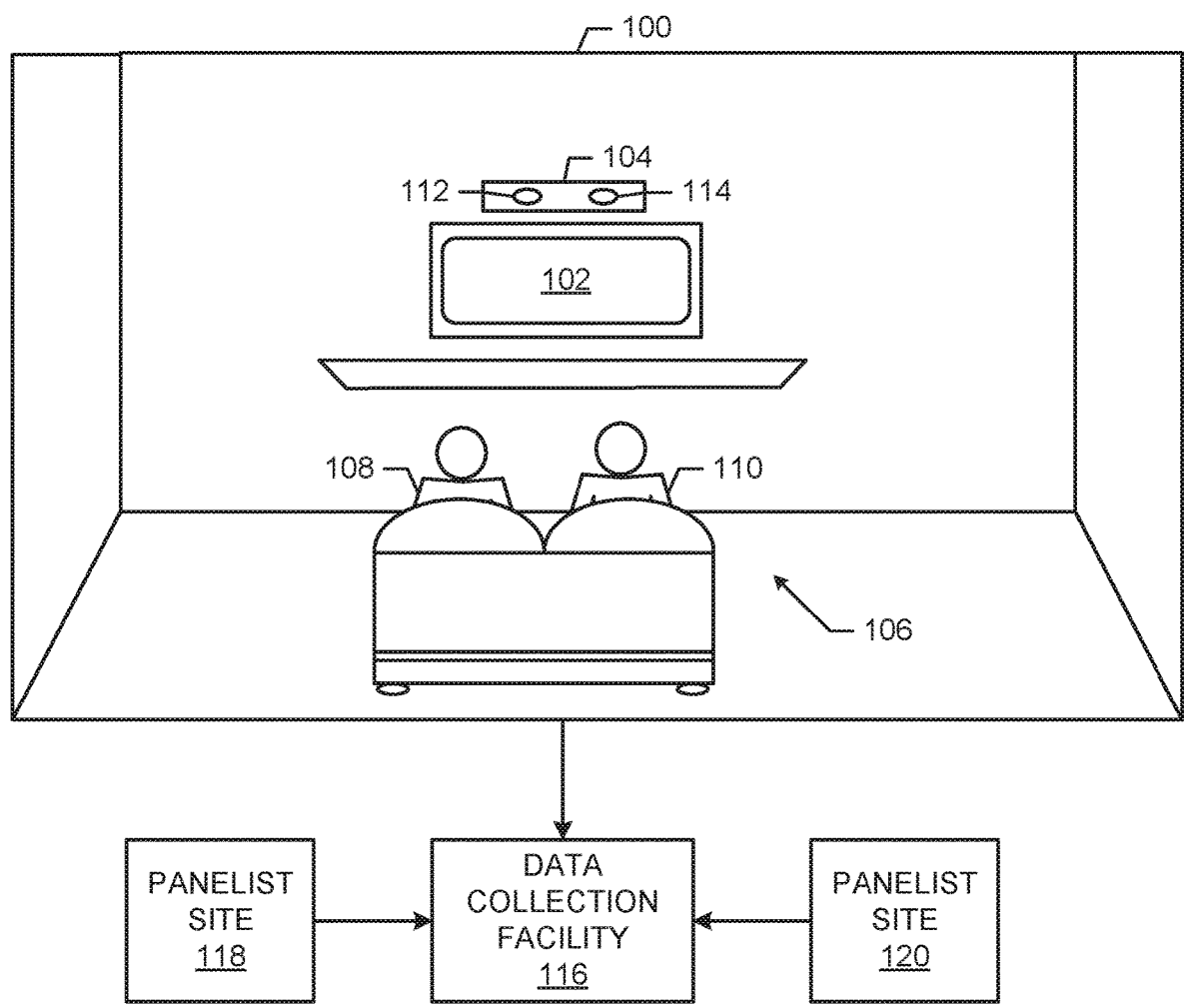
FIG. 1 is a block diagram of an example environment in which an example media monitoring system including an example meter constructed in accordance with teachings of this disclosure is deployed.

While example methods and apparatus to count people are disclosed below in connection with a media exposure environment and an audience measurement system, examples disclosed herein can be employed in additional and/or alternative contexts, environments, applications, devices, systems, etc. that count people such as, for example, surveillance systems, consumer behavior monitors deployed in shopping centers, etc. Further, example methods and apparatus disclosed herein to count people can be utilized in connection with systems that categorize (e.g., according to, for example, age, gender, mood, etc.) and/or recognize people.

Audience measurement systems collect data associated with media exposure environments such as, for example, a television room, a family room, a living room, a bar, a restaurant, an office space, a cafeteria, etc. For example, an audience measurement system may collect media identifying information from media presentations being played in the media environment. Additionally or alternatively, the audience measurement system may collect people data by obtaining a series of images of the environment and analyzing the images to determine, for example, an identity of one or more persons present in the media exposure environment, an amount of people present in the media exposure environment during one or more times and/or periods of time, an amount of attention being paid to a media presentation by one or more persons, a gesture made by a person in the media exposure environment, etc.

In some examples, the people data is correlated with the media identifying information corresponding to detected media to provide exposure data for that media. For example, an audience measurement entity (e.g., The Nielsen Company (US), LLC) can calculate ratings for a first piece of media (e.g., a television program) by correlating data collected from a plurality of panelist sites with the demographics of the panelist. For example, in each panelist site wherein the first piece of media is detected in the monitored environment at a first time, media identifying information for the first piece of media is correlated with presence information detected in the environment at the first time. The results from multiple panelist sites are combined and/or analyzed to provide ratings representative of exposure of an audience (e.g., an entire population, a demographic segment, etc.) to the media.

To count people in a media exposure environment, some audience measurement systems attempt to recognize objects as humans in image data representative of the media exposure environment. The audience measurement system maintains a people count for each frame of image data to reflect a number of people in the environment at a time corresponding to a respective frame. Based on whether portions of the image data are determined to correspond to a person, the traditional audience measurement devices increment or decrement the people count. In some systems, portions of the image data are determined to include a person based on whether a face appears in the image data. However, faces of people often are undetected or unrecognized due to, for example, partial visibility, lighting conditions, obscuring of the face due to eating or drinking, or a rotation of a head relative to a camera capturing the frames, etc. Additionally, faces of people in the media exposure environment may go undetected or unrecognized due to field of view limitations associated with an image sensor. In other words, the image sensor tasked with captured images of the media exposure environment may not have a wide enough field of view to capture certain faces of people that are being exposed to media. Additionally, a non-human object, such as a picture of a human face hanging on a wall, is sometimes mistaken for a human face, thereby improperly inflating the tally for the corresponding frame. An identification of a non-human object as a face is referred to herein as a false positive.

These and other limitations and/or inaccuracies can lead to an inaccurate count of people for individual frames. An inaccurate people count in a frame can negatively affect the accuracy of media exposure data generated using the tally. For example, an audience measurement system counting the people in a room may also be collecting media identifying information to identify media being presented (e.g., aurally and/or visually) in the room. With the identification of the media and the number of people in the room at a given date and time, the audience measurement system can indicate how many people were exposed to the specific media and/or associate the demographics of the people to determine audience characteristics for the specific media. When face(s) are not detected or recognized as faces, the exposure data for the identified media may be undercut (e.g., the media is accredited with fewer viewers/listeners than had actually been exposed to the media). Alternatively, when false positives are detected, the exposure data for the identified media may be overstated (e.g., the media is accredited with more viewers/listeners than had actually been exposed to the media).

Example methods, apparatus, and articles of manufacture disclosed herein increase the accuracy of people counts or tallies by analyzing images captured over a period of time. To compensate for limitations of facial detection abilities on a frame-by-frame basis (e.g., a face that is properly identified as a face in a first frame may not be identified as a face in a second frame despite the actual presence of the face in the second frame), examples disclosed herein analyze a plurality of frames captured over a period of time (e.g., twenty seconds, thirty seconds, one minute, etc.) to generate a people count for that period of time. That is, rather than generating a people count for each individual frame, examples disclosed herein generate a people count for a period of time as a whole, thereby increasing the accuracy of the corresponding people counts or tallies.

However, analyzing images taken over a period of time as a whole creates challenges for accurately counting the people appearing in the images, especially when more than one image capturing device is employed. For example, due to possibility of a person moving throughout the environment during the period of time, difficulty arises in identifying a uniqueness of individuals. That is, a first and second face detections may be mistakenly determined to correspond to two different individuals when, in fact, the first and second face detections correspond to one unique individual. Such a misinterpretation of the image data causes the corresponding people count to be inaccurate. Additionally or alternatively, due to the possibility of a person being detected in an overlap region (e.g., a region in which different fields of view of different image capturing devices intersect), difficulty arises in identifying a uniqueness of individuals with respect to the different image capturing devices. That is, confusion may arise between a first face detection made from first image data captured by a first image capturing device and a second face detection made from second image data captured by a second image capturing device.

In attempts to address the difficulties in identifying the uniqueness of individuals in the environment, some systems reference facial recognition databases that include image data known to correspond to particular persons. When a face is detected in such systems, aspects of the face detection are used to query the facial recognition databases to obtain an identity of the person. Such systems then have a unique identifier (e.g., a name or assigned number) for the face detection, thereby providing a level of uniqueness. However, developing and maintaining the facial recognition databases requires significant investment and resources. For example, the facial recognition databases include significantly large amounts of memory to accommodate the great number of images needed to develop a reasonably functional facial recognition process. In particular, for each individual, a plurality of different images is stored in the databases such that the individuals can be recognized in different circumstances (e.g., different poses, different lighting, different angles, different expressions, etc.).

Moreover, due at least in part to the large size of the facial recognition databases and the vast number of images in the databases, high performance equipment (e.g., processors and communication interfaces) is needed to provide results to an inquirer at a reasonable speed. In particular, people counting systems are gathering image data at high rates (e.g., every two-hundred (200) milliseconds) and, when processing of the image data includes querying the facial recognition databases, results of the queries are required at high rates. Moreover, use of the facial recognition database, which has large numbers of images, may result in false positives. That is, while the large size of the facial recognition databases provides the ability to recognize many different individuals, the number of false positives is proportional to the size of the facial recognition databases. Moreover, to develop the facial recognition databases, active cooperation of the individuals is typically required. For example, to obtain the image data known to correspond to a particular individual, the particular individual provides identification information and provides (e.g., allows) images of himself or herself in the plurality of different circumstances (e.g., different poses, different lighting, different angles, different expressions, etc.). These and other challenges involved with people counting present difficulties in determining a uniqueness of individuals and, thus, an accurate people count.

Example methods and apparatus disclosed herein determine a number of unique people present in an environment (e.g., a media exposure environment) during a period of time (e.g., twenty seconds) by generating a temporary list of characteristic datasets, each of which corresponds to a face detection occurring during the period of time. Thus, each characteristic dataset generated by examples disclosed herein corresponds to a face detected during the period of time. In some examples disclosed herein, a characteristic dataset corresponding to a face detection includes one or more facial feature vectors representative of the detected face. Examples disclosed herein populate the temporary list with characteristic datasets obtained from image data captured by first and second image capturing devices. Examples disclosed herein populate the temporary list with characteristic datasets corresponding to faces detected in overlapping regions and non-overlapping regions alike. In some examples, each of the obtained characteristic datasets is stored in the temporary list. Alternatively, in some examples disclosed herein, a subset of the characteristic datasets collected during the period of time (e.g., for a particular location or coordinate in the image data), is stored in the temporary list. That is, in some disclosed examples, a number of characteristic datasets stored in the temporary list at, for example, a particular location (e.g., corresponding to a same person) is limited or capped (e.g., at two (2)), thereby reducing memory resources consumed by the temporary list and further reducing an amount of comparisons to be performed based on the temporary list. As disclosed in detail below, characteristic datasets are selected for the subset based on, for example, a distinctness or difference between the obtained characteristic datasets such that the subset includes characteristic datasets that are substantially (e.g., meeting a threshold) difference from each other, thereby representing different poses or perspectives of the corresponding face.

When the temporary list has been populated for the entire period of time, examples disclosed herein compare the individual characteristic datasets to each other to determine a number of unique individuals present in the environment during the period of time. In some examples, when the characteristic datasets include facial feature vectors, the comparison of the characteristic datasets to each other involves comparing one set of facial feature vectors to another set of facial feature vectors. When the comparison determines that a first one of the characteristic datasets is sufficiently similar (e.g., within a threshold) to a second one of the characteristic datasets, examples disclosed herein determine that the face detections corresponding to the first and second characteristic datasets correspond to the same unique individual. Conversely, when the comparison determines that the first one of the characteristic datasets is not sufficiently similar to the second one of the characteristic datasets, examples disclosed herein determine that the face detections corresponding to the first and second characteristic datasets correspond to different unique individuals. Using these determinations by way of the comparisons, examples disclosed herein determine a number of unique individuals present in the environment during the period of time. Examples disclosed herein store the determined number of unique individuals as a people count for the period of time.

The list generated by examples disclosed herein is temporary in that, when the people count for the period of time has been calculated and/or stored, examples disclosed herein discard (e.g., delete) the contents of the temporary list. For example, after a people count has been determined for a first period of time based on a first plurality of characteristic datasets, examples disclosed herein delete the first plurality of characteristic datasets from the temporary list and begin re-populating the temporary list with second characteristic datasets obtained during a second period of time subsequent to the first period of time. Examples disclosed herein perform the comparison discussed above between the second characteristic datasets to determine a number of unique individuals. As such, examples disclosed herein generate first and second people counts for first and second periods of time, respectively.

Notably, examples disclosed herein generate determine uniqueness between faces for the people counts without having to rely on a facial recognition database that includes specific identities of specific individuals stored in association with many different representations of the respective individuals. That is, examples disclosed herein differentiate between face detections obtained from, for example, different image capturing devices, in different regions of the corresponding fields of views, and/or at different times, without having to query a facial recognition database external to (e.g., separately implemented and/or different from) the temporary list to determine whether the different face detections corresponding to a same or different individual. Accordingly, examples disclosed herein provide accurate people counts while avoiding development, maintenance, and interaction with the burdensome, resource-consuming facial recognition system. As a result, examples disclosed herein provide the people counts with improved accuracy (e.g., by not incurring the penalties associated with the false positives associated with querying large facial recognition databases), improved speed (e.g., by not having to wait for results from a query of a large facial recognition database), reduced deployment difficulty (e.g., by not having to require participation and consent of people in development of a facial recognition database), etc.

Moreover, by discarding the contents of the temporary list at the end of each period of time for which a people count is determined and by, in some examples, limiting the temporary list to subset(s) (e.g., the two (2) most distinct characteristic datasets found at a particular location or coordinate) of obtained characteristic datasets, examples disclosed herein simplify the comparison process involved in determining uniqueness of a plurality of face detections. In particular, examples disclosed herein compare a particular characteristic dataset corresponding to a particular face detection only to other characteristic datasets of the temporary list, the content of which is repeatedly deleted. As such, these comparisons are few in number, especially relative to the great number of comparisons involved in querying a facial recognition database. The reduction in the number of comparisons provided by examples disclosed herein reduces processing loads, reduces processing times, improves accuracy (e.g., by reducing the number of false positives due to the smaller candidate pool size), etc. Moreover, by discarding the contents of the temporary list after each period of time and by, in some examples, limiting the temporary list to the subset(s) of characteristic datasets, examples disclosed herein reduce an amount of memory required to store the captured image data. Moreover, by discarding the contents of the after each period of time and by, in some examples, limiting the temporary list to the subset(s) of characteristic datasets, examples disclosed herein prevent misleading image data, such as distorted image data that may lead to inaccurate results, from adversely affecting other periods of time. That is, the discarding of the information after each period of time by examples disclosed herein, prevents bad data from poisoning the well from which conclusions are drawn, thereby preventing inaccurate counts from propagating.

FIG. 1 illustrates an example media exposure environment 100 including a media presentation device 102, an example meter 104 constructed in accordance with teachings of this disclosure, and an audience 106 including a first person 108 and a second person 110. In the illustrated example of FIG. 1, the media presentation device 102 is a television and the media exposure environment 100 is a room of a household (e.g., a room in a home of a panelist such as the home of a "Nielsen family") that has been statistically selected to develop television ratings data for population(s)/demographic(s) of interest. In the illustrated example of FIG. 1, one or more persons of the household have registered with an audience measurement entity (e.g., by agreeing to be a panelist) and have provided demographic information to the audience measurement entity as part of a registration process to enable association of demographics with viewing activities (e.g., media exposure). The example meter 104 of FIG. 1 can be implemented in additional and/or alternative types of environments such as, for example, a room in a non-statistically selected household, a theater, a restaurant, a tavern, a retail location, an arena, etc. In some examples, the example meter 104 of FIG. 1 is implemented, at least in part, in connection with additional and/or alternative types of media presentation devices such as, for example, a radio, a computer, a tablet (e.g., an iPad®), a cellular telephone, and/or any other communication device able to present media to one or more individuals.

In some examples, the meter 104 of FIG. 1 is implemented by software installed in consumer electronics associated with the environment 100 such as, for example, a set-top box, a BluRay disc player, and/or a video game system (e.g., an) (BOXED having a Kinect® sensor). In such instances, the example meter 104 of FIG. 1 is, for example, downloaded from a network, installed at the time of manufacture, installed via a port (e.g., a universal serial bus (USB) port receiving a jump drive provided by the audience measurement company), installed from a storage disc (e.g., an optical disc such as a BluRay disc, Digital Versatile Disc (DVD) or CD (compact Disk)), and/or any other suitable manner of installation. Executing the meter 104 on equipment associated with (e.g., owned by) one or more panelists is advantageous in that costs of installation are reduced by relieving the audience measurement entity of the need to supply hardware to the monitored household. In some examples, the meter 104 is integrated with the consumer electronics (e.g., by the manufacturer prior to sale to the consumer). That is, in some examples, the consumer electronics into which the meter 104 is integrated may be repurposed (and/or data collected by the consumer electronics may be repurposed) for audience measurement. For example, the meter 104 of FIG. 1 may utilize one or more sensors of a video game system to collect, for example, image data from the environment 100.

In some examples, rather than installing the meter 104 on the consumer electronics of the panelist(s), the example meter 104 of FIG. 1 is a dedicated audience measurement unit provided by the audience measurement entity. In such examples, the meter 104 may include its own housing, hardware (e.g., processor, logic circuit, etc.), memory and software to perform the desired audience measurement functions.

In the illustrated example of FIG. 1, the meter 104 includes a first image capturing device 112 and a second image capturing device 114. Use of the first and second image capturing devices 112, 114 increases field of view capabilities of the meter 104 and, thus, the likelihood that each person located in a monitored environment is detected and counted. In the illustrated example of FIG. 1, the first and second image capturing devices 112, 114 simultaneously capture respective images of the environment 100 for a particular time. That is, for the particular time, the first and second image capturing devices 112, 114 generate a pair of image frames. As described in detail below in connection with FIG. 2, a first field of view of the first image capturing device 112 intersects with a second field of view of the second image capturing device 114 to form an overlap region. In the illustrated example of FIG. 1, the meter 104 includes an audio sensor to capture audio data representative of audio present in the environment 100. As described in detail below in connection with FIG. 3, the audio sensor of the example meter 104 may be used to capture media identifying information present in audio data output by, for example, the media presentation device 102.

In some examples, the meter 104 is adapted to communicate with (e.g., via a wired and/or wireless connection), for example, information capturing devices and/or audio sensors implemented in the environment 100 such as, for example, a video game system having image capturing equipment and/or audio capturing equipment. In some examples, the communications are effected via the consumer electronics of the panelist (e.g., via a video game console).

The example meter 104 of FIG. 1 reports collected information (e.g., data representative of media being presented in the environment 100, data representative of the audience 106, and/or data representative of a state of the media presentation device 102) to, for example, a data collection facility 116. In the illustrated example of FIG. 1, the data collection facility 116 receives information from other panelist sites 118,120 in addition to the example media exposure environment 100 of FIG. 1. In the example of FIG. 1, the data collection facility 116 is associated with the audience measurement entity that deployed the meter 104 in the environment 100. The audience measurement entity associated with the example data collection facility 116 of FIG. 1 utilizes the information collected from the example media exposure environment 100 and/or the panelist sites 118, 120 to generate exposure information. The information from many panelist locations may be collected and analyzed to generate ratings (e.g., in real-time or non-real-time) representative of media exposure by one or more populations of interest.

Figure 2:
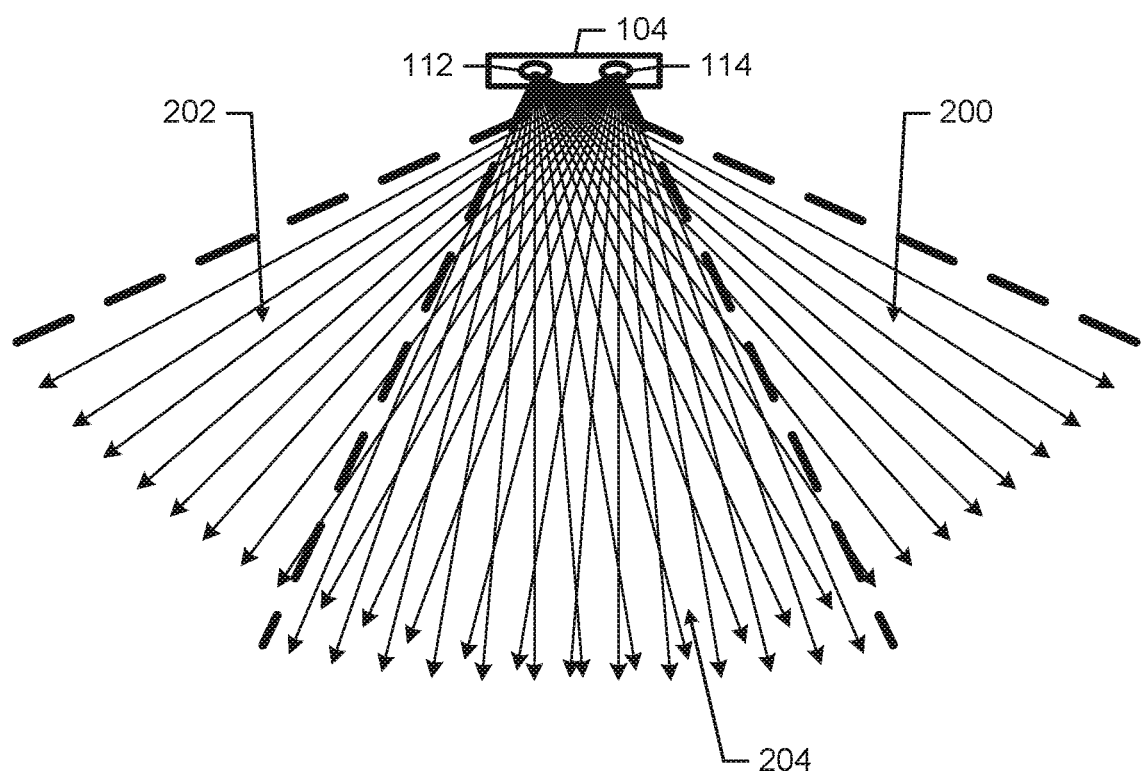
FIG. 2 is an illustration of an example overlap region associated with the first and second image capturing devices of FIG. 1.

FIG. 2 shows intersections of the fields of view of the first and second image sensors 112, 114 of the example meter 104 of FIG. 1. Patterns of the example fields of view shown in FIG. 2 may vary depending on, for example, capabilities (e.g., depth of capture ranges) of the first and/or second image capturing devices 112, 114 and/or the arrangement of the first and/or second image capturing devices 112, 114. A first region including the field of view of the first image capturing device 112 is labeled with reference numeral 200 in FIG. 2. A second region including the field of view of the second image capturing device 114 is labeled with reference numeral 202 in FIG. 2. An overlap region in which the first region 200 and the second region 202 intersect is labeled with reference numeral 204 in FIG. 2. A person detected in the overlap region 204 is susceptible to being double counted and, thus, causing incorrect people counts. Further, a person moving across the regions 200-204 during a period time is susceptible to being double counted for that period of time and, thus, causing incorrect people counts. As disclosed below, examples disclosed herein enable the example meter 104 to overcome these sources of potential errors by identifying unique faces (e.g., by comparing facial feature vectors collected from detected people) in the environment 100 regardless of different detections of the same person in different ones of the regions 200-204 during a particular period of time.

Figure 3:
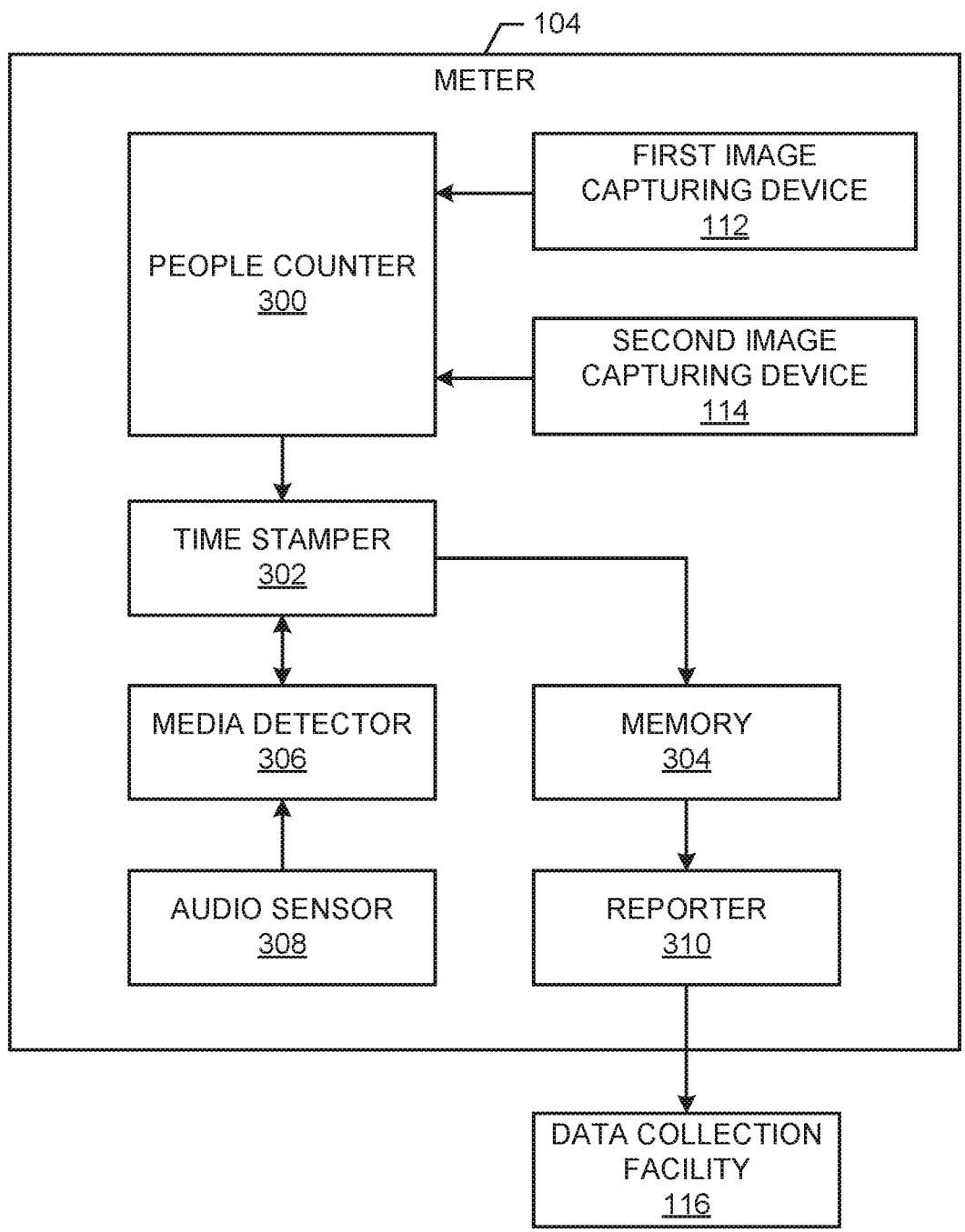
FIG. 3 is a block diagram of an example implementation of the example meter of FIG. 1.

FIG. 3 illustrates an example implementation of the meter 104 of FIG. 1. The example meter 104 of FIG. 3 includes a people counter 300 to detect a number of people present in the environment 100 during respective periods of time. For example, based on analyses of image data provided to the people counter 300 by the first and second image capturing devices 112, 114, the example people counter 300 of FIG. 3 outputs people counts representative numbers of people present in the environment 100 during respective periods of time. For example, the people counter 300 of FIG. 3 outputs a first number, such as two (2), to indicate that two (2) unique people were present in the environment 100 during a first thirty (30) second period of time. Additionally, for a second thirty (30) second period of time, the people counter 300 of FIG. 3 outputs a second number, such as four (4) to indicate that four (4) unique people were present in the environment 100 during the second thirty (30) second period of time. An example implementation of the example people counter 300 of FIG. 3 is disclosed below in connection with FIGS. 4-6.

In the illustrated example of FIG. 3, the people counter 300 conveys the people counts to a time stamper 302. The example time stamper 302 of FIG. 3 includes a clock and a calendar. The example time stamper 304 of FIG. 3 associates a period of time (e.g., 1:00:00 p.m. Central Standard Time (CST) to 1:00:30 p.m. CST) and date (e.g., Jan. 1, 2015) with each people count provided by the people counter 300 by, for example, appending the period of time and date information to an end of the people count. In some examples, the time stamper 304 applies a single time and date rather than a period of time, with the single time indicate of a beginning or an end of the period of time for which the corresponding people count was generated by the people counter 300.

A data package (e.g., the people count and the time stamp) is stored in memory 304 of the example meter 104. The example memory 304 of FIG. 3 may include a volatile memory (e.g., Synchronous Dynamic Random Access Memory (SDRAM), Dynamic Random Access Memory (DRAM), RAMBUS Dynamic Random Access Memory (RDRAM, etc.) and/or anon-volatile memory (e.g., flash memory). The example memory 304 of FIG. 3 may also include one or more mass storage devices such as, for example, hard drive disk(s), compact disk drive(s), digital versatile disk drive(s), etc. When the example meter 104 is integrated into, for example, a video game system or a set-top box, the meter 104 may utilize memory of the video game system or the set-top box to store information such as, for example, the people counts generated by the example people counter 300 and time stamped by the example time stamper 302.

The example time stamper 302 of FIG. 3 also receives data from an example media detector 306 of the example meter 104 of FIG. 2. The example media detector 306 of FIG. 3 detects presentation(s) of media in the media exposure environment 100 of FIG. 1 and/or collects identification information associated with the detected presentation(s). In some examples, the media detector 306 of FIG. 3 detects the presentation(s) of media based on audio information collected by an audio sensor 308. Additionally or alternatively, the media detector 306 of FIG. 3, which may be in wired and/or wireless communication with the media presentation device 102 (e.g., a television), a video game system deployed in the environment 100, a set-top box associated with the media presentation device 102, and/or any other component of FIG. 1 to obtain information via additional or alternative type(s) of sensor(s).

In some examples, the media detector 306 of FIG. 3 identifies a presentation time and/or a source of a presentation. The presentation time and the source identification data (e.g., channel identification data) may be utilized to identify the program by, for example, cross-referencing a program guide configured, for example, as a look up table. In such instances, the source identification data is, for example, the identity of a channel (e.g., obtained by monitoring a tuner of a set-top box or a digital selection made via a remote control signal) currently being presented on the media presentation device 102 of FIG. 1.

Additionally or alternatively, the example media detector 306 of FIG. 3 can identify the presentation by detecting codes and/or watermarks embedded with or otherwise conveyed (e.g., broadcast) with media being presented via a set-top box and/or the media presentation device 102. As used herein, a code is an identifier that is transmitted with and/or otherwise associated with media for the purpose of identifying (e.g., an audience measurement code) the media and/or a source of the media and/or for the purpose of tuning to (e.g., a packet identifier (PID) header and/or other data used to tune or select packets in a multiplexed stream of packets) the corresponding media. Codes may be carried in the audio, in the video, in metadata, in a vertical blanking interval, in a program guide, in content data, or in any other portion of the media and/or the signal carrying the media. In the illustrated example of FIG. 3, the media detector 306 extracts the code(s) from the media. In some examples, the media detector 306 may collect samples of the media and export the samples to a remote site (e.g., the data collection facility 116 of FIG. 1) for detection of the code(s).

Additionally or alternatively, the example media detector 306 of FIG. 3 can collect a signature to identify the media. As used herein, a signature is a representation of a characteristic of the signal carrying or representing one or more aspects of the media (e.g., a frequency spectrum of an audio signal). Signatures may be thought of as fingerprints of the media. Collected signature(s) can be compared against a collection of reference signatures of known media (e.g., content and/or advertisements) to identify tuned media. In some examples, the signature(s) are generated by the media detector 306. Additionally or alternatively, the example media detector 306 of FIG. 3 collects samples of the media and exports the samples to a remote site (e.g., the data collection facility 116 of FIG. 1) for generation of the signature(s).

In the example of FIG. 3, the media detector 306 conveys the media identifying information (e.g., a code) to the example time stamper 302, which time stamps the received information. In the illustrated example of FIG. 3, the time stamper 306 appends a time stamp to the received media identifying information to generate a data package including the media identifying information and a time indicative of when the media detector 306 collected the media identifying information from the environment 100.

To convey data to the example data collection facility 116, the example meter 104 of FIG. 2 includes a reporter 310. The example reporter 310 of FIG. 3 utilizes a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.) to communicate with the data collection facility 116 and/or other devices. In some examples, the reporter 310 utilizes communication capabilities (e.g., network connections) of a video game system and/or a set-top box to communicate with, for example, the data collection facility 116.

While an example manner of implementing the meter 104 of FIG. 1 is illustrated in FIG. 3, one or more of the elements, processes and/or devices illustrated in FIG. 3 may be combined, divided, re-arranged, omitted, eliminated and/or implemented in any other way. Further, the example people counter 300, the example time stamper 302, the example media detector 306, the example reporter 310 and/or, more generally, the example meter 104 of FIG. 3 may be implemented by hardware, software, firmware and/or any combination of hardware, software and/or firmware. Thus, for example, any of the example people counter 300, the example time stamper 302, the example media detector 306, the example reporter 310 and/or, more generally, the example meter 104 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example people counter 300, the example time stamper 302, the example media detector 306, the example reporter 310 and/or, more generally, the example meter 104 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 104 of FIG. 1 may include one or more elements, processes and/or devices in addition to, or instead of, those illustrated in FIG. 3, and/or may include more than one of any or all of the illustrated elements, processes and devices.

Figure 4:
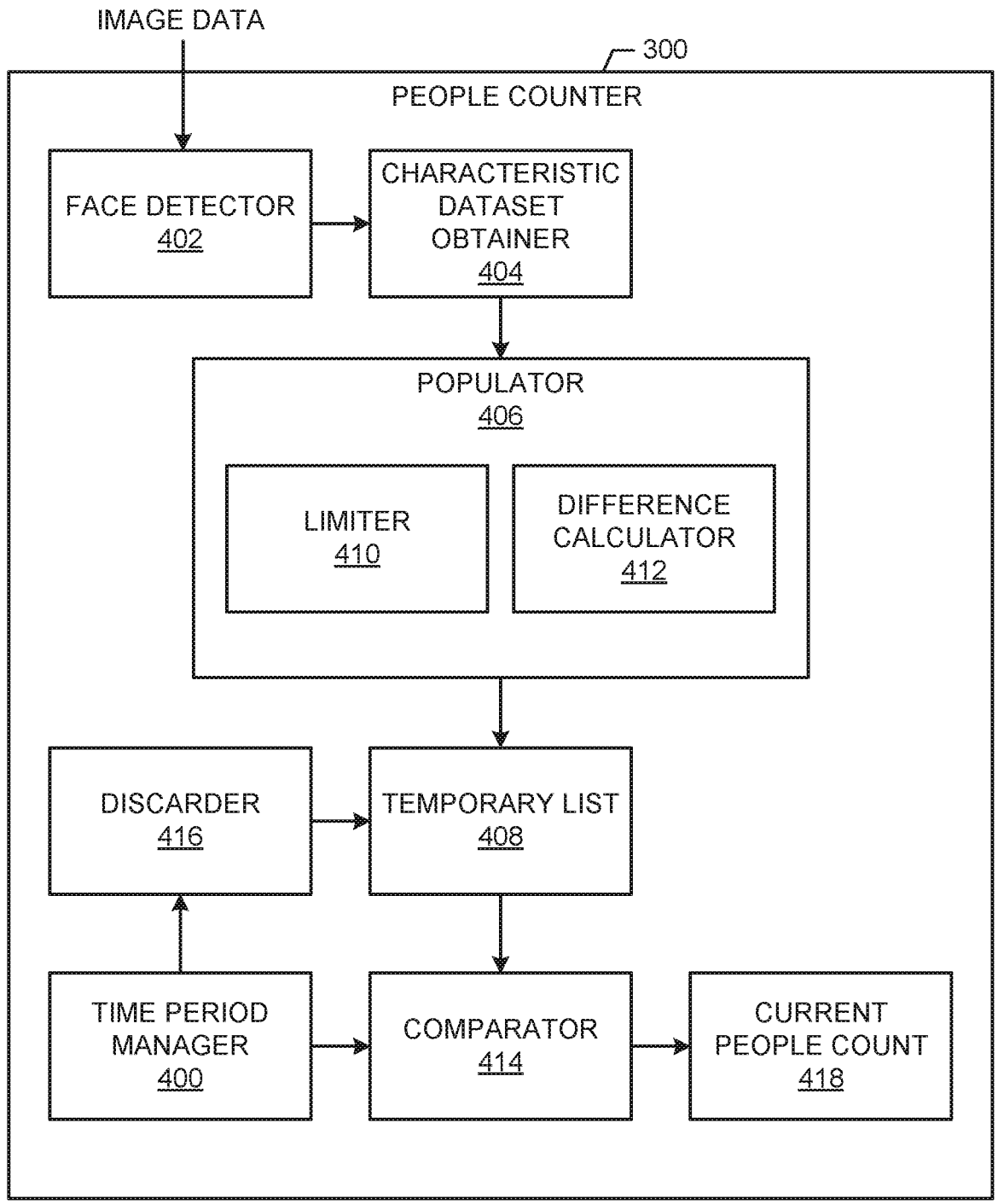
FIG. 4 is a block diagram of an example implementation of the example people counter of FIG. 3.

FIG. 4 illustrates an example implementation of the people counter 300 of FIG. 3. The example people counter 300 of FIG. 4 determines a number of unique people in the environment 100 during individual periods of time. In the illustrated example of FIG. 4, the people counter 300 includes a time period manager 400 to control operations of components of the people counter 300 based on time. In the illustrated example of FIG. 4, the time period manager 400 defines (e.g., based on user input received from an administrator of the meter 104) a duration of the periods of time for which the people counts are determined. For example, the time period manager 400 of FIG. 4 defines the duration of the periods of time as twenty (20) seconds or thirty (30) seconds or one (1) minute. In the illustrated example of FIG. 4, the time period manager defines the duration of the periods of time to be thirty (30) seconds. Thus, the example people counter 300 of FIG. 4 determines a first people count for a first period of time lasting thirty (30) seconds, a second people count for a second period of time, subsequent to the first period of time, lasting thirty (30) seconds, etc. In the illustrated example of FIG. 4, the time period manager 400 utilizes a timer to track a current period of time and to identify an end of the current period of time. As disclosed below, the example time period manager 400 of FIG. 4 triggers certain operations in the people counter 300 in response to determining (e.g., based on an expiration of the timer or the timer reaching a designation time) that the current period of time has ended. The example time period manager 400 of FIG. 4 resets the timer upon its expiration to begin a new period of time.

The example people counter 400 of FIG. 4 includes a face detector 402 to detect face(s) in the image data provided by the first and second image capturing devices 112, 114. The example face detector 402 of FIG. 4 utilizes any suitable technique and/or algorithm to analyze the received image data and to determine location(s) (e.g., coordinate(s) in the image data) of any face(s) present in the environment 100. For example, the face detector 402 determines whether a general shape expected of a human head and/or a human face is present in the image data. Upon determining that the image data includes a human face, the example face detector 402 of FIG. 4 generates a face detection and associated a corresponding location (e.g., a coordinate, such as an X-Y value, in the environment 100) with the face detection.

When the example face detector 402 of FIG. 4 detects a face in the environment 100, the face detector 402 conveys an indication of the face detection to a characteristic dataset obtainer 404 of the example people counter 300. In the illustrated example of FIG. 4, the indication of the face detection includes the location (e.g., a coordinate, such as an X-Y value, in the environment 100) at which the corresponding face was detected by the face detector 402. The example characteristic dataset obtainer 404 of FIG. 4 analyzes an area of the corresponding image data (e.g., a frame of image data) associated with the received location to extract a characteristic dataset representative of the detected face. In the illustrated example of FIG. 4, the characteristic dataset obtainer 404 extract facial feature vector(s) from the image data at the received location. The facial feature vector(s) extracted by the example characteristic dataset obtainer 404 include, for example, a distance and direction of a space between two facial features such as the two eyes, the tip of the nose and a center of the mouth, the bridge of the nose and the chin, etc. Taken together, such facial feature vectors provide a signature of the face that is unique (e.g., beyond a threshold level of uniqueness). Thus, should the example characteristic dataset obtainer 404 of FIG. 4 obtain (1) a first characteristic dataset from a first face in a first frame of image data capturing by the first image capturing device 112 and (2) a second characteristic dataset from the same first face in a second frame of image data captured by the first image capturing device 112 at a later time or by the second image capturing device 114 at a same time, a comparison of the first and second characteristic datasets would inform the example people counter 300 of FIG. 4 that the two faces separately captured in the different frames belong to the same unique individual. Conversely, should the first characteristic dataset be derived from a second face belonging to a different individual than the first face, comparison of the first and second characteristic datasets would inform the example people counter 300 of FIG. 4 that the two faces separately captured in the different frames respectively belong to different unique individuals. The comparison of the characteristic datasets obtained by the example characteristic dataset obtainer 404 is disclosed in greater detail below.

While the example characteristic dataset obtainer 404 of FIG. 4 extracts or otherwise obtains facial feature vector(s) to form the characteristic datasets, additional or alternative types of data and/or datasets can be used as signature information capable of uniquely identifying an individual.

In the illustrated example of FIG. 4, the example characteristic dataset obtainer 404 of FIG. 4 provides the characteristic dataset(s) and the corresponding location(s) to a populator 406. The example populator 406 of FIG. 4 populates a temporary list 408 of the example people counter 300 of FIG. 4. The example temporary list 408 of FIG. 4 is implemented by any suitable data structure using any suitable type of memory. An example representation of the temporary list 408 of FIG. 4 is illustrated in FIG. 5. In some examples, when the example populator 406 receives information from the characteristic dataset obtainer 404, the example populator 406 adds the received information to the temporary list 408 (e.g., by conveying the received information to a designated area of memory dedicated to the temporary list 408). Accordingly, as the first and second image capturing devices 112, 114 provide image data to the people counter 300 and the image data is processed by the face detector 402 and the characteristic dataset obtainer 404, the temporary list 408 receives information that can be used to uniquely identify respective individuals.

In the example of FIG. 5, the populator 406 populates a first section 500 of the temporary list 408 with a location identifier indicative of the location (e.g., coordinate) from which the characteristic dataset was obtained by the characteristic dataset obtainer 404. In the example of FIG. 5, the populator 406 populates a second section 502 of the temporary list 408 with the characteristic dataset (e.g., one or more feature vectors). In some examples, the populator 406 adds each obtained characteristic dataset to the temporary list 408.

Alternatively, in some examples, the populator 406 provides a subset of the obtained characteristic datasets to the temporary list 408. The example populator 406 of FIG. 4 includes a limiter 410 and a difference calculator 412 to select a maximum number of the obtained characteristic datasets for inclusion in the temporary list 408. For example, the limiter 410 and the difference calculator 412 of FIG. 4 may cooperate to populate the temporary list 408 with at most two (2) characteristic datasets for any given location in the environment 100 as represented in the image data. As such, the example limiter 410 and the difference calculator 412 reduce an amount of characteristic datasets stored in the temporary list 408 such that a number of comparisons to be performed between the items of the temporary list 408 is reduced, thereby improving speed and enabling computing platforms of limited resources to adequately process the data.

In the illustrated example of FIG. 4, the limiter 410 and the difference calculator 412 receive a characteristic dataset from a particular frame of image data and determine whether the received characteristic dataset should be added to the temporary list 408 for the corresponding location based on a degree of similarity between the received characteristic dataset and, if any are present, characteristic dataset(s) of the temporary list 408. The example limiter 410 maintains a limit setting (e.g., adjustable by a user and/or administrator of the system), the value of which reflects of the maximum number of characteristic datasets is to be stored in the temporary list 408 for an individual location. For example, in the temporary list 408 of FIG. 5, the value of the limit setting in the limiter 410 is two (2). The example limiter of FIG. 4 utilizes the difference calculator 412 to limit the two (2) characteristic datasets in the temporary list 408 for each location to, when more than two are available, the two most distinct characteristic datasets collected from that location.

The example difference calculator 412 of FIG. 4 determines a degree of similarity between two characteristic datasets (e.g., a first characteristic datasets of a frame currently being processed and a second characteristic dataset stored in the temporary list 408 from a previously processed frame). When the characteristic datasets are feature vectors, the example difference calculator 412 of FIG. 4 determines a distance between the feature vectors, where a degree of dissimilarity increases with a value of the calculated distance. The example difference calculator 412 provides the resulting degree of similarity (or degree of dissimilarity) to the limiter 410. The example limiter 410 of FIG. 4 determines whether the current characteristic dataset should be added to the temporary list 408 based on the degree of similarity.

When the temporary list 408 is empty (e.g., when a first frame of a period of time is being processed), the example limiter 410 adds the currently obtained characteristic dataset to the temporary list 408. When the temporary list 408 already includes a characteristic dataset, the example difference calculator 412 determines a degree of similarity between the currently obtained characteristic dataset and the characteristic dataset present in the temporary list 408. The example difference calculator 412 of FIG. 4 provides the degree of similarity to the example limiter 410. The example limiter 410 of FIG. 4 determines whether the degree of similarity is greater than a threshold. When the degree of similarity is greater than the threshold, indicating that the two characteristic datasets are substantially (e.g., with a threshold) similar, the example limiter 410 of FIG. 4 discards the currently obtained characteristic dataset without adding the currently obtained characteristic dataset to the temporary list 408. However, when the degree of similarity is less than the threshold, indicating that the two characteristic datasets are not substantially similar, the example limiter 410 of FIG. 4 adds the currently obtained characteristic dataset to the temporary list 408 (e.g., by adding the currently obtained characteristic dataset to the second portion 502 of the example temporary list 408 of FIG. 5).

When the temporary list 408 already includes two characteristic datasets for a particular location in the image data, and a characteristic dataset is received at the populator 406 for that location, the example limiter 410, based on calculations performed by the difference calculator 412, selects the two most distinct of the three characteristic datasets for the temporary list 408. For example, the example difference calculator 412 determines a first degree of similarity between the first and second characteristic datasets already present in the temporary list 408, a second degree of similarity between the first characteristic dataset already in the temporary list 408 and the currently obtained characteristic dataset, and a third degree of similarity between the second characteristic dataset already present in the temporary list 408 and the currently obtained characteristic dataset. From these calculations of the difference calculator 412, the example limiter 410 of FIG. 4 determines the two least similar of the first, second and third characteristic datasets and selects those two for storage in the temporary list 408. In the illustrated example, the non-selected characteristic dataset is discarded. Accordingly, the temporary list 408 is populated with at most two characteristic datasets for each location at which a face detection occurred, the two characteristic datasets for each location being the two most distinct characteristic datasets found at that location for the current period of time.

As discussed above, the example time period manager 400 of FIG. 4 controls components of the people counter 300 such that the people counter 300 generates people counts for respective periods of time having a defined duration. In particular, the example time period manager 400 of FIG. 4 controls a comparator 414 and a discarder 416 of the people counter 300. When the example time period manager 400 of FIG. 4 indicates and/or determines that a current period of time has ended, the example time period manager 400 of FIG. 4 triggers the comparator 414 to compare the contents of the temporary list 408 to each other. As discussed above, the temporary list 408 includes characteristic dataset(s) corresponding to faces detected in the image data representative of the environment 100 throughout the current period of time (e.g., the previous thirty (30) seconds). For each comparison, the example comparator 414 of FIG. 4 determines whether the two characteristic datasets (e.g., a first characteristic dataset from a first location and a second characteristic dataset from a second location) being compared are substantially similar (e.g., within a threshold). In the illustrated example of FIG. 4, the characteristic dataset(s) of the temporary list 408 are facial feature vectors extracted from the detected faces. Thus, in the illustrated example of FIG. 4, the comparator 414 compares the facial feature vectors of a first one of the characteristic dataset(s) of the temporary list 408 to the facial feature vectors of the other characteristic dataset(s) of the temporary list 408. The example comparator 414 of FIG. 4 considers the first and second characteristic datasets being compared substantially similar when a threshold number of the facial feature vectors of the first characteristic dataset are substantially similar (e.g., within a threshold length and/or a threshold direction) to the corresponding facial feature vectors of the second characteristic dataset. Conversely, the example comparator 414 of FIG. 4 considers the first and second characteristic datasets being compared not substantially similar when there the threshold number of similar facial feature vectors between the first and second characteristic datasets is not found. Additional or alternative measurements of similarity are possible.

In the illustrated example of FIG. 4, the comparator 414 performs such comparisons until all of the locations and/or all of the characteristic dataset(s) of the temporary list 408 have been compared to each other. The example comparator 414 of FIG. 4 uses the results of the comparisons to determine a number of unique individuals represented by the contents of the temporary list 408. For example, when first and second ones of the locations 500 of the temporary list 408 are determined to include substantially similar characteristic datasets according to the comparator 414, the example comparator 414 determines that the a single individual occupies the first and second locations, and, thus, increments a current people count 418 by one. Thus, for each instance of a unique individual being found in the temporary list 408, the comparator 414 increments the current people count 418.

When the comparator 414 has compared all of the locations and/or all of the characteristic dataset(s) of the temporary list 408, the example time period manager 400 of FIG. 4 triggers the discarder 416 to discard the contents of the temporary list 408. For example, the discarder 416 of FIG. 4 deletes or erases the data corresponding to the temporary list 408. As such, the temporary list 408 is empty at an onset of the subsequent period of time for which a subsequent people count is to be generated. With the temporary list 408 emptied, the example populator 406 begins re-populating the temporary list 408 for the now current period of time as the people counter 300 receives additional image data from the image capturing devices 112, 114 and the image data is processed by the face detector 402 and the characteristic dataset obtainer 404.

Notably, this technique of attaining knowledge of uniqueness of the detected faces by maintaining the temporary list 408 and comparing the characteristic datasets of the temporary list 408 to each other, as opposed to querying a facial recognition database, represents a significant improvement in speed, accuracy, and efficiency when counting people in the environment 100. For example, comparing the relatively small amount of characteristic datasets of the temporary list 408 to each other consumes significantly less time that a query submitted to a vastly populated facial recognition database. Moreover, comparing the characteristic datasets of the temporary list 408 to each other to determine uniqueness, rather than utilizing a facial recognition to determine uniqueness, avoids altogether a need for developing, maintaining and/or gaining access to a facial recognition database for purposes of counting people. Not having to develop, maintain, and/or gain access to the facial recognition database reduces a number of network communications, reduces network resources (e.g., bandwidth) consumed by the process, reduces a processing load of network interfaces, eliminates a need for willing participants to populate the facial recognition database, reduces computational loads placed on processers, etc. Moreover, by limiting the comparisons of image data to the relatively small amount of characteristic datasets in the temporary list 408, rather than the populous facial recognition database, the example people counter 300 of FIG. 4 reduces a false positive rate, which is typically proportional to a size of the candidate image data. Moreover, by discarding the contents of the temporary list 408 after each period of time, the example people counter 300 shields future comparison results from any potentially poisonous data such as, for example, misleading or distorted image data that may cause erroneous results.

While an example manner of implementing the people counter 300 of FIG. 3 is illustrated in FIG. 4, one or more of the elements, processes and/or devices illustrated in FIG. 4 may be combined, divided, re-arranged, omitted, eliminated and/or implemented in any other way. Further, the example time period manager 400, the example face detector 402, the example characteristic dataset obtainer 404, the example populator 406, the example limiter 410, the example difference calculator 412, the example comparator 414, the example discarder 416 and/or, more generally, the example people counter 300 of FIG. 4 may be implemented by hardware, software, firmware and/or any combination of hardware, software and/or firmware. Thus, for example, any of the example time period manager 400, the example face detector 402, the example characteristic dataset obtainer 404, the example populator 406, the example limiter 410, the example difference calculator 412, the example comparator 414, the example discarder 416 and/or, more generally, the example people counter 300 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example time period manager 400, the example face detector 402, the example characteristic dataset obtainer 404, the example populator 406, the example limiter 410, the example difference calculator 412, the example comparator 414, the example discarder 416 and/or, more generally, the example people counter 300 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example people counter 300 of FIG. 3 may include one or more elements, processes and/or devices in addition to, or instead of, those illustrated in FIG. 4, and/or may include more than one of any or all of the illustrated elements, processes and devices.

Figure 6:
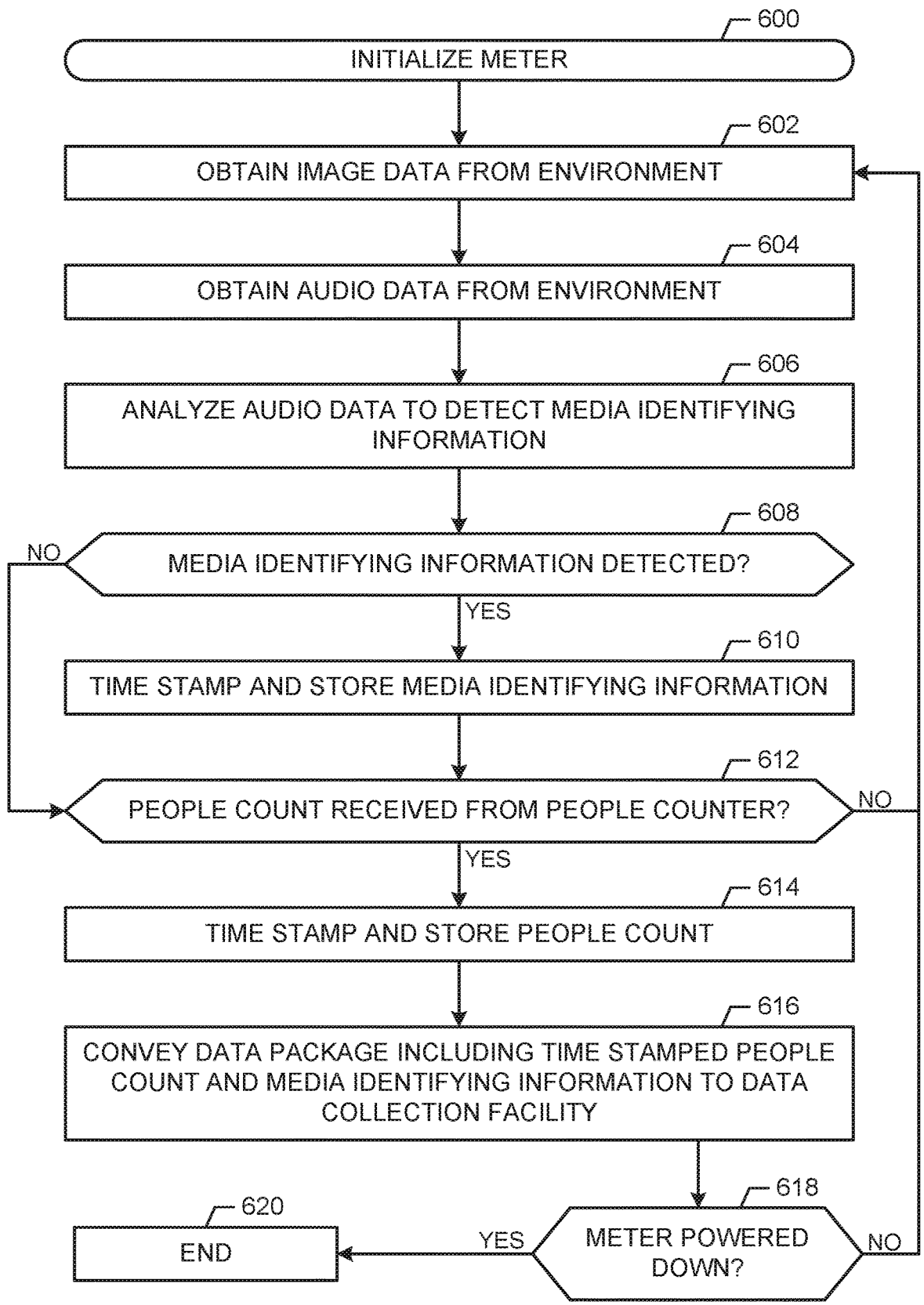
FIG. 6 is a flowchart representative of example machine readable instructions that may be executed to implement the example meter of FIGS. 1 and/or 3.
Figure 7A:
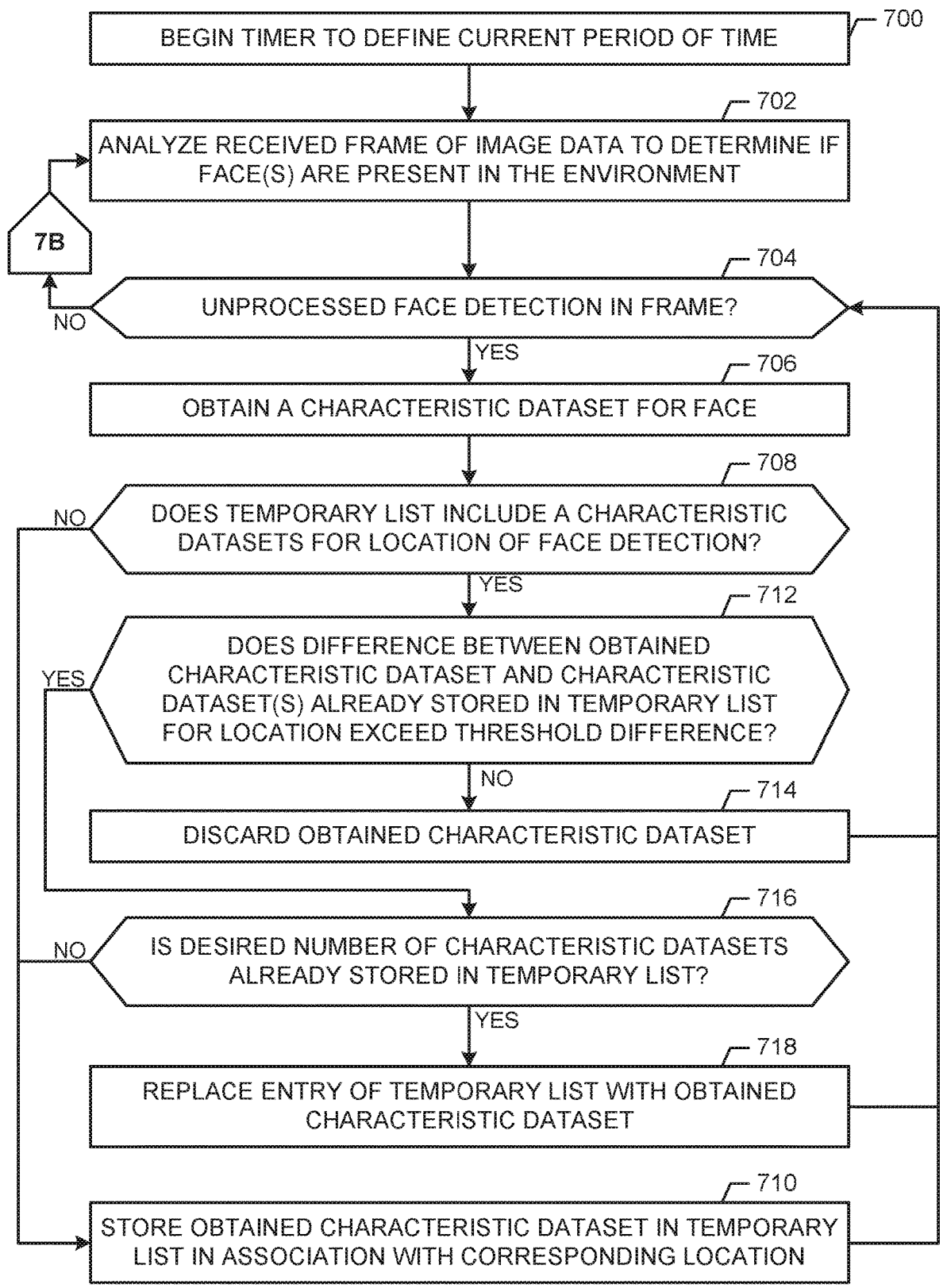
FIGS. 7A and 7B are a flowchart representative of example machine readable instructions that may be executed to implement the example people counter of FIGS. 3 and/or 4.
Figure 7B:
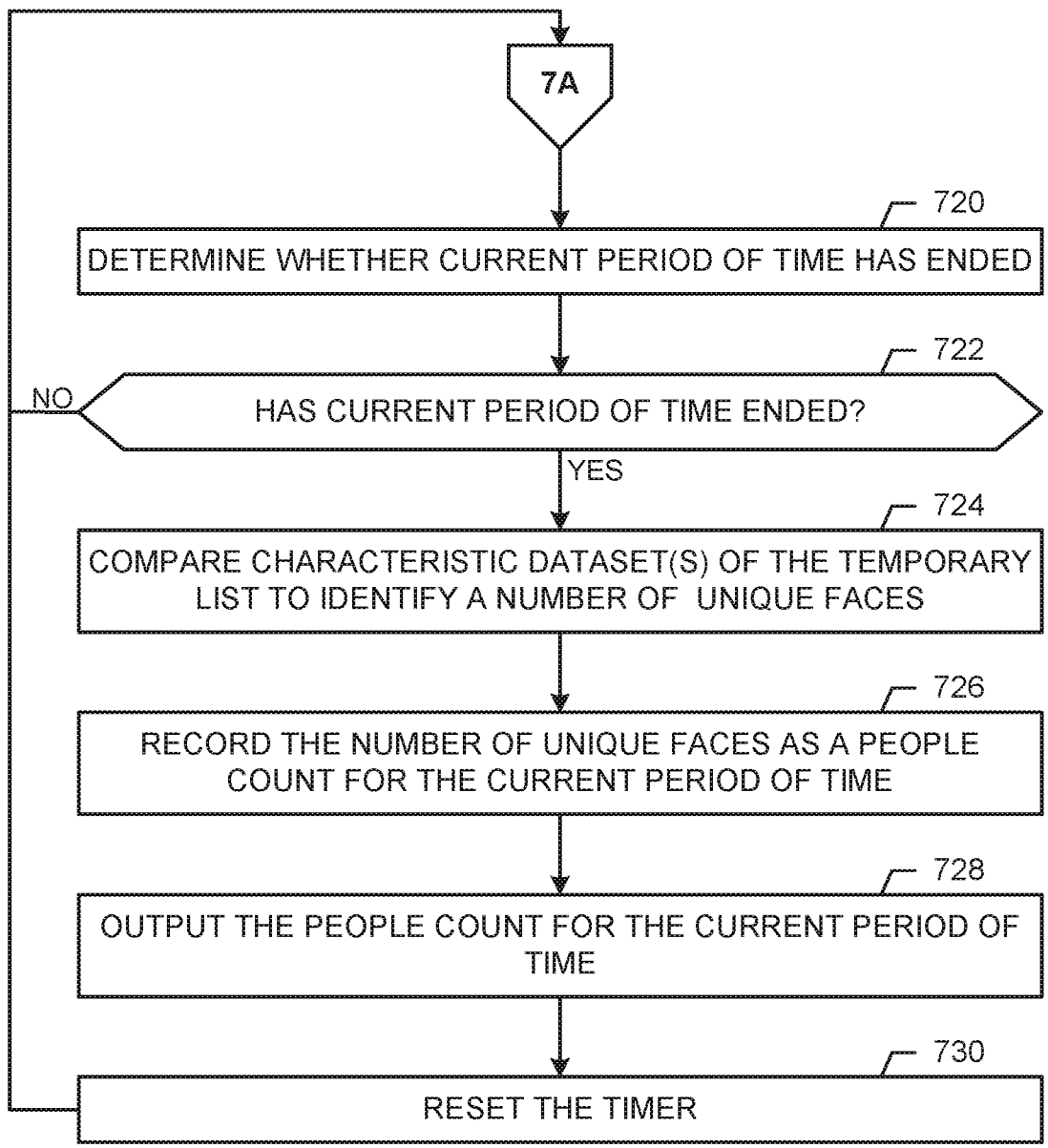

A flowchart representative of example machine readable instructions for implementing the example meter 104 of FIGS. 1 and/or 3 is shown in FIG. 6. A flowchart representative of example machine readable instructions for implementing the example people counter 300 of FIGS. 3 and/or 4 is shown in FIGS. 7A and 7B. In these examples, the machine readable instructions comprise programs for execution by a processor such as the processor 812 shown in the example consumer electronics device 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire programs and/or parts thereof could alternatively be executed by a device other than the processor 812 and/or embodied in firmware or dedicated hardware. Further, although the example programs are described with reference to the flowcharts illustrated in FIGS. 6, 7A and 7B, many other methods of implementing the example meter 104 and/or the example people counter 300 may alternatively be used. For example, the order of execution of the blocks may be changed, and/or some of the blocks described may be changed, eliminated, or combined.

As mentioned above, the example processes of FIGS. 6, 7A and/or 7B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6, 7A and/or 7B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example of FIG. 6 begins with an initialization of the example meter 104 (block 600). In the illustrated example of FIG. 6, the meter 104 is initialized in response to, for example, the media presentation device 102 being deployed in the environment 100 and/or activation of the meter 104. The example first and second image capturing devices 112, 144 obtain image data from the environment 100 (block 602). In the illustrated example, the first and second image capturing devices 112, 144 have different fields of view 200, 200 (FIG. 2) that intersect to form the overlap region 204. In the illustrated example, the first and second image capturing devices 112, 114 captured frames of image data at a rate of, for example, one frame per second. The obtained frames of image data are provided to the people counter 300. As disclosed below in connection with FIG. 6, the people counter 300 utilizes the frames of image data to determine a number of unique faces appearing the frames of image data throughout a current period of time (e.g., a current thirty (30) second period of time).

In the example of FIG. 6, the audio sensor 308 obtains audio information from the environment 100 and provides the audio information to the media detector 306 (block 604). The example media detector 306 analyzes the audio information provided by the audio sensor 308 to determine if the audio information includes media identifying information (e.g., a code) (block 606). While audio information is used to detect media identifying information in the example of FIG. 6, additional or alternative sources of information can be utilized to identify media being presented in the environment 100 (e.g., by the media presentation device 102 and/or other device(s)). In the example of FIG. 6, if media identifying information is detected in the environment 100 (block 608), the media detector 306 provides the media identifying information (e.g., a code detected in the audio information and/or an identifier extracted from the audio information by the media detector 306) the time stamper 302, which time stamps the media identifying information and provides the time-stamped data to the memory 304 (block 610). In some examples, such as when the example meter 104 is deployed outside a household (e.g., in a public store and/or in a security system), the audio information is not collected, not stored, and/or not analyzed.

If media identifying information is not detected in the audio information (block 608), it is determined whether the people counter 300 has provided a people count for the current period of time (block 612). As discussed above and below in connection with FIG. 6, the people counter 300 generates a people count for a current period of time when, for example, the current period of time has ended. Accordingly, in the example of FIG. 6, the people counter 300 outputs a people count for the current period to the time stamper 302 when the people count has been generated. If the people counter 300 has not yet generated the people count (block 612), control returns to block 602 and the collection devices (e.g., the first and second image capturing devices 112, 114 and the audio sensor 308) of the meter 104 obtain more image data and audio information.

On the other hand, if the people counter 300 has output a people count for the current period of time (block 612), the time stamper 302 receives the people count, time stamps the received people count, and provides the time-stamped people count to the memory 304 for storage (block 614). Accordingly, the memory 304 includes the time-stamped people count for a period of time corresponding to, for example, 1:00:00-1:00:30 p.m. CST and the media identifying information detected and/or extracted by the media detector 306 during that period of time. In the example of FIG. 6, the reporter 310 generates a data package including the time-stamped people count and the media identifying information detected and/or extracted during the period of time (block 616). Further, the reporter 310 conveys the data package to, for example, the data collection facility 116 (block 616).

If the meter 104 is powered down (block 618), the example of FIG. 6 ends (block 620). Otherwise, control returns to block 602.

FIG. 7A begins with the time period manager 400 starting a timer that is configured according to the defined amount of time for the periods of time for which people counts are generated (block 700). In the example of FIG. 7A, the periods of time for which the people counts are generated are each thirty (30) seconds. However, the timer can be set to any suitable amount of time. As discussed below, expiration of the timer signals an end of the current period of time.

In the example of FIG. 7A, the face detector 402 receives a frame of image data from, for example, the first image capturing device 112 and analyzes the received frame to determine whether face(s) appear in the corresponding image data (block 702). For example, the face detector 402 determines if a shape of a human head and/or such a shape having facial features (e.g., eyes, nose, mouth, etc.) is present in the image data. As disclosed above, when the example face detector 402 detects a face in the frame of image data, the face detector 402 determines location(s) (e.g., coordinate(s)) of the detected face(s) in the frame. If the face detector 402 has detected a face that has not yet been processed (block 704), the location of the unprocessed face detection is provided to the characteristic dataset obtainer 404, which obtains a characteristic dataset for each detected face in the frame (block 706). In the example of FIG. 7A, the characteristic dataset obtained for a face includes one or more facial feature vectors representative of different aspects of the face. The facial feature vectors captured by the example characteristic dataset obtainer 404 are capable of representing a unique individual.

In the example of FIG. 7A, the characteristic dataset obtainer 404 provides the extracted and/or otherwise obtained characteristic dataset(s) to the populator 406. In some examples, the populator 406 populates the temporary list 408 of the people counter 300 with the characteristic datasets such that the temporary list 408 includes data representative of each face detected in the frame of image data. In the example of FIG. 7A, the populator 406 limits a number of characteristic datasets stored in the temporary list 408 for a particular location in the image data to, for example, a desired number or a desired maximum number. That is, in the example of FIG. 7A, when more than the desired number of characteristic datasets is collected by the populator 406 for a particular location (e.g., coordinate), the example populator 406 limits the number of characteristic datasets provided to the temporary list 408 to a subset of the obtained characteristic datasets. Further, in the illustrated example of FIG. 7A, when the temporary list 408 already includes one or more characteristic datasets, the populator 406 controls population of the temporary list 408 such that an obtained characteristic dataset is added to the temporary list 408 when the obtained characteristic dataset is sufficiently distinct (e.g., different beyond on a threshold difference measurement) from the characteristic dataset(s) already stored in the temporary list 408.

To limit the characteristic datasets stored in the temporary list 406 to the desired number and to sufficiently distinct characteristic datasets, when a characteristic dataset is obtained for a location, the limiter 410 determines whether the temporary list 408 already includes a characteristic dataset for the location (block 708). For example, the limiter 410 queries the temporary list 408 with the location information received in association with the obtained characteristic dataset to determine whether the corresponding entry in the temporary list 408 (e.g., in the first section 500 of the example temporary list 408 of FIG. 5) already includes a characteristic dataset (e.g., in the second section 502 of FIG. 5) (block 708). Thus, for example, when the first frame of the current of period of time is determined to include a face (e.g., via the face detector 402), the example limiter 410 determines that the temporary list does not include a characteristic dataset for the corresponding location (block 708). In response to such a determination, the example populator 406 stores the obtained characteristic dataset in the temporary list 408 by, for example, populating an entry in the first section 500 of the temporary list 408 with a location identifier and populating an entry in the second section 502 of the temporary list 408 with the characteristic dataset obtained by the characteristic dataset obtainer 404 (block 710).

Alternatively, at block 708, if the limiter 410 determines that the temporary list already includes a characteristic dataset for the location of the obtained characteristic dataset (e.g., for a second frame captured during the current period of time subsequent to the first frame), the example difference calculator 412 determines whether a difference between the obtained characteristic dataset (e.g., from the second frame) and the characteristic dataset(s) already stored in the temporary list 408 exceeds a threshold difference (e.g., a threshold distance between facial feature vectors) (block 712). If the difference calculator 412 determines that the difference does not exceed the threshold difference (block 712), the limiter 410 discards the obtained characteristic dataset (714). Put another way, the limiter 410 prevents the populator 406 from storing the obtained characteristic dataset in the temporary list 408 (block 714).

Alternatively, if the difference calculator 412 determines that the difference does exceed the threshold difference (block 712), the limiter 410 determines whether the desired (e.g., maximum) number of characteristic datasets are already stored in the temporary list 408 for the current period of time (block 716). For example, the limiter 410 determines whether the second section 502 of the temporary list 408 already includes two (2) entries at the corresponding location (e.g., as indicated in the first section 500). If the limiter 410 determines that the desired number of characteristic datasets is already stored in the temporary list 408 (block 716), the example populator 406 replaces one of the entries in the temporary list 408 for the location with the currently obtained characteristic dataset (block 718). In the illustrated example, the populator 406 selects one of the stored characteristic datasets for replacement such that the two most distinct characteristic datasets are stored in the temporary list 408. Alternatively, if the limiter 410 determines that the desired number of characteristic datasets is not already stored in the temporary list 408 (e.g., the second section 502 includes one (1) entry at the location of the currently obtained characteristic dataset) (block 716), the populator 406 stores the obtained characteristic dataset in the temporary list 408 (block 710). Accordingly, in the example of FIG. 7A, the temporary list 408 is populated with a desired number (e.g., a maximum number, such as two (2)) of characteristic datasets for each location at which a face is detected.

In the example of FIG. 7A, control proceeds to block 720 of FIG. 7B when the current frame does not include a face or if each face in the frame has been processed (e.g., has been discarded at block 714 or added to the temporary list 408 at block 710 or 718). In the example of FIG. 7B, the time period manager 400 determines whether the current period of time has ended (e.g., the timer initialized at block 700 has reached zero, if counting down, or has reached thirty

(30) seconds, if counting up) (block 720). If the current time period of time has not yet ended (block 720), control returns to block 702 of FIG. 7A and another frame of image data is obtained and analyzed by the face detector 402. In the illustrated example, which includes the first and second image capturing devices 114, the next frame of image data is a frame of image data captured by the second image capturing device 114 at a substantially similar (e.g., within a threshold) time as the frame captured by the first image capturing device 112, from which characteristic dataset(s) (if any) have already been obtained. The frame provided by the second image capturing device 114 undergoes blocks 706-718. Notably, when an individual is located in the overlap region 204 of FIG. 2, the first image capturing device 112 and the second image capturing device 114 have likely detected the same face. In such scenarios, the temporary list 408 may include two characteristic datasets that correspond to the same individual. Further, the face of the same individual may appear in a different region (e.g., the first field of view 200) at a later time within the current period of time when that individual moves across the environment 100. Thus, the temporary lists 408 may include a plurality of characteristic datasets that correspond to the same individual. However, due to the manner in which the people counter 300 compares the characteristic datasets of the temporary list 408 to each other for the current period of time, the individual is not counting more than once, thereby accurately representing the number of unique number of individuals in the environment 100 during the current period of time.

If the time period manager 400 determines that the current period of time has ended (block 720, the time period manager 400 triggers the comparator 414 to compare the characteristic datasets of the temporary list 408. The comparator 414 compares the characteristic datasets by, for example, determining a degree of similarity between the facial feature vectors of the characteristic datasets being compared (block 724). In the illustrated example of FIG. 7B, the comparator 414 compares all of the characteristic datasets at one location of the temporary list 408 to all other ones of the characteristic datasets of the temporary list 408 at different locations. Thus, the resulting number of unique characteristic datasets found by the comparator 414 corresponds to the number of unique individuals in the environment 100 during the current period of time. The example comparator 414 tracks (e.g., records) the number of unique individuals found in the environment 100 during the current period of time as the current people 414 (block 726). The current people count is output to, for example, the time stamper 302 of the meter 104 (block 728). In the example of FIG. 7B, the time period manager 400 resets the timer such that a new period of time begins (block 730). Control returns to block 702 and the face detector 402 receives a new frame of image data that will be processed as belonging to the new period of time.

Figure 8:
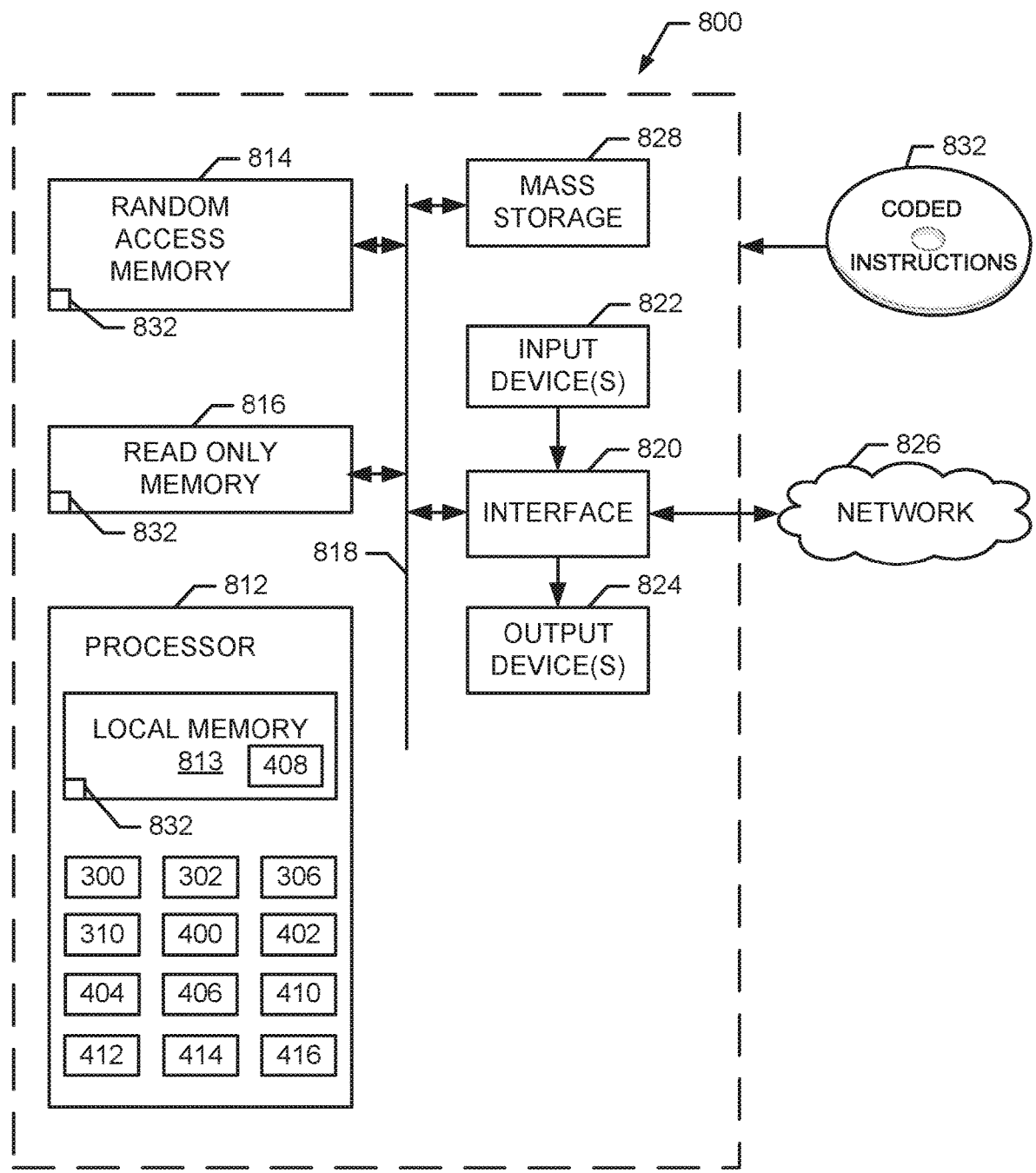
FIG. 8 is a block diagram of an example consumer electronics device implementing the example meter of FIGS. 1 and/or 3 by executing the example machine readable instructions of FIG. 6 and/or implementing the example people counter of FIGS. 3 and/or 4 by executing the example machine readable instructions of FIGS. 7A and 7B.

FIG. 8 is a block diagram of an example consumer electronics device 800 that has been repurposed to execute the instructions of FIG. 5 to implement the example meter 104 of FIGS. 1 and/or 3 and/or repurposed to execute the instructions of FIG. 6 to implement the example people counter 300 of FIGS. 3 and/or 4. The consumer electronics device 800 can be, for example, a server, a personal computer, a DVD player, a CD player, a digital video recorder, a Blu-ray player, a gaming console, a personal video recorder, a set top box, or any other type of computing device.

The consumer electronics device 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the people counter 300, the time stamper 302, the media detector 306, the reporter 310, the time period manager 400, the face detector 402, the characteristic dataset obtainer 404, the populator 406, the limiter 410, the difference calculator 412, the comparator 414 and/or the discarder 416 is/are implemented via the example processor 812.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller. In the illustrated example of FIG. 8, the temporary list 408 is implemented in the local memory 813.

The consumer electronics device 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touch screen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touch screen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The consumer electronics device 800 of the illustrated example also includes one or more mass storage devices 828 for storing software and/or data. In some examples, the example real-time database 404 of FIG. 4 is implemented via the example one more mass storage devices 828 of FIG. 8. Examples of such mass storage devices 828 include floppy disk drives, hard drive disks, compact disk drives, Blu-ray disk drives, RAID systems, and digital versatile disk (DVD) drives.

Coded instructions 832 of FIGS. 6, 7A and/or 7B may be stored in the mass storage device 828, in the volatile memory 814, in the non-volatile memory 816, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   instructions; and
   processor circuitry to execute the instructions to at least:
      populate a list with first characteristic datasets obtained from a first plurality of images representative of an environment during a first period of time of a media presentation, respective ones of the first characteristic datasets representative of corresponding faces detected in the environment during the first period of time;
      limit a number of the first characteristic datasets stored in the list for a first location represented in the first plurality of images;
      perform comparisons of the first characteristic datasets to each other to determine a first number of unique faces in the environment during the first period of time, the comparisons limited to the first characteristic datasets obtained during the first period of time;
      delete the first characteristic datasets from the list after the first period of time has ended; and
      re-populate the list with second characteristic datasets obtained from a second plurality of images representative of the environment during a second period of time of the media presentation, the second period of time subsequent to the first period of time.

2. The apparatus of claim 1, wherein the processor circuitry is not to query a facial recognition database to determine the first number of unique faces in the environment.

3. The apparatus of claim 1, wherein the comparisons are first comparisons, and the processor circuitry is to:
   perform second comparisons of the second characteristic datasets to each other to determine a second number of unique faces in the environment during the second period of time; and
   limit the second comparisons to the second characteristic datasets obtained during the second period of time.

4. The apparatus of claim 1, wherein the processor circuitry is to:
   compare the first characteristic datasets to each other after the first period of time has ended; and
   delete the first characteristic datasets from the list after the first period of time has ended.

5. The apparatus of claim 1, wherein the processor circuitry is to obtain media identifying information during the first period of time.

6. The apparatus of claim 5, wherein the processor circuitry is to generate a data package including the media identifying information detected during the first period of time and the first number of unique faces determined to be in the environment during the first period of time.

7. The apparatus of claim 1, wherein the processor circuitry is to detect faces in the first image data, the first characteristic datasets being obtained from locations of the faces in the first image data.

8. The apparatus of claim 1, wherein the processor circuitry is to obtain the first and second characteristic datasets, the first and second characteristic datasets including facial feature vectors.

9. A people counting apparatus comprising:
   at least one memory;
   instructions; and
   processor circuitry to execute the instructions to at least:
      calculate a degree of similarity between a first characteristic dataset representative of a first face detection in a first image at a first image location and a second characteristic dataset representative of a second face detection in a second image at the first image location, the first and second images included in a plurality of images representative of an environment during a first period of time of a media presentation;
      store the first characteristic dataset and the second characteristic dataset in a plurality of characteristic datasets associated with the first period of time in response to the degree of similarity not satisfying a threshold;
      store the first characteristic dataset in the plurality of characteristic datasets and discard the second characteristic dataset in response the degree of similarity satisfying the threshold to limit a number of stored characteristic datasets associated with the first image location; and
      compare the plurality of characteristic datasets to each other to determine a number of unique faces in the environment during the first period of time.

10. The apparatus of claim 9, wherein the processor circuitry is to calculate a distance between a first facial feature vector of the first characteristic dataset and a second facial feature vector of the second characteristic dataset to determine the degree of similarity between the first characteristic dataset and the second characteristic dataset, the first characteristic dataset includes a first set of facial feature vectors including the first facial feature vector, and the second characteristic dataset includes a second set of facial feature vectors including the second facial feature vector.

11. The apparatus of claim 10, wherein the first facial feature vector includes a distance and a direction for a space between two facial features associated with the first face detection, and the second facial feature vector includes a distance and a direction for a space between two facial features associated with the second face detection.

12. The apparatus of claim 9, wherein the processor circuitry is to specify a maximum value for the number of stored characteristic datasets associated with the first image location.

13. The apparatus of claim 12, wherein the degree of similarity is a first degree of similarity, and when the first characteristic dataset and the second characteristic dataset are stored in the plurality of characteristic datasets, the processor circuitry is to:
   calculate a second degree of similarity between the first characteristic dataset and a third characteristic dataset representative of a third face detection in a third image at the first location; and
   calculate a third degree of similarity between the second characteristic dataset and the third characteristic dataset.

14. The apparatus of claim 13, wherein the processor circuitry is to:
  store the first characteristic dataset, the second characteristic dataset and the third characteristic dataset in the plurality of characteristic datasets in response to the first degree of similarity, the second degree of similarity and the third degree of similarity not satisfying the threshold and the number of stored characteristic datasets associated with the first image location not exceeding the maximum value; and
  store two of the least similar of first characteristic dataset, the second characteristic dataset and the third characteristic dataset and discard the other of the first characteristic dataset, the second characteristic dataset and the third characteristic dataset in response to the first degree of similarity, the second degree of similarity and the third degree of similarity not satisfying the threshold and the number of stored characteristic datasets associated with the first image location exceeding the maximum value.

15. A people counting apparatus comprising:
at least one memory;
instructions; and
processor circuitry to execute the instructions to at least:
  calculate a degree of similarity between a first characteristic dataset associated with a first image and a second characteristic dataset associated with a second image, the first image and the second image included in a plurality of images representative of an environment during a first period of time of a media presentation;
  store the first characteristic dataset in a plurality of characteristic datasets and discard the second characteristic dataset in response to the degree of similarity satisfying a threshold; and
  compare the plurality of characteristic datasets to determine a number of unique faces in the environment during the first period of time.

16. The apparatus of claim 15, wherein the processor circuitry is to calculate a distance between a first facial feature vector of the first characteristic dataset and a second facial feature vector of the second characteristic dataset to determine the degree of similarity between the first characteristic dataset and the second characteristic dataset, the first characteristic dataset includes a first set of facial feature vectors including the first facial feature vector, and the second characteristic dataset includes a second set of facial feature vectors including the second facial feature vector.

17. The apparatus of claim 16, wherein the first facial feature vector includes a first distance and a first direction for a first space between two facial features associated with a first face detection, and the second facial feature vector includes a second distance and a second direction for a second space between two facial features associated with a second face detection.

18. The apparatus of claim 16, wherein the processor circuitry is to specify a limit on a number of stored characteristic datasets associated with a first image location.

19. The apparatus of claim 18, wherein the degree of similarity is a first degree of similarity, and when the first characteristic dataset and the second characteristic dataset are stored in the plurality of characteristic datasets, the processor circuitry is to:
  calculate a second degree of similarity between the first characteristic dataset and a third characteristic dataset associated with a third image; and
  calculate a third degree of similarity between the second characteristic dataset and the third characteristic dataset.

20. The apparatus of claim 19, wherein the processor circuitry is to:
  store the first characteristic dataset, the second characteristic dataset and the third characteristic dataset in the plurality of characteristic datasets in response to the first degree of similarity, the second degree of similarity and the third degree of similarity not satisfying the threshold and the number of stored characteristic datasets associated with the first image location not exceeding the limit; and
  store two of the least similar of the first characteristic dataset, the second characteristic dataset and the third characteristic dataset and discard the other of the first characteristic dataset, the second characteristic dataset and the third characteristic dataset in response to the first degree of similarity, the second degree of similarity and the third degree of similarity not satisfying the threshold and the number of stored characteristic datasets associated with the first image location exceeding the limit.

* * * * *